June 6, 1961  E. W. P. FRANZ  2,987,168
CONVEYOR MECHANISM
Filed Oct. 10, 1957  6 Sheets-Sheet 1

Fig. 1.

INVENTOR
ETHAN W. P. FRANZ,
BY
ATTORNEY

June 6, 1961      E. W. P. FRANZ      2,987,168
CONVEYOR MECHANISM Filed Oct. 10, 1957      6 Sheets-Sheet 3

INVENTOR
ETHAN W. P. FRANZ,

ATTORNEY

June 6, 1961 E. W. P. FRANZ 2,987,168
CONVEYOR MECHANISM
Filed Oct. 10, 1957 6 Sheets-Sheet 5

INVENTOR
ETHAN W. P. FRANZ,
BY
ATTORNEY

June 6, 1961 E. W. P. FRANZ 2,987,168
CONVEYOR MECHANISM
Filed Oct. 10, 1957 6 Sheets-Sheet 6

INVENTOR
ETHAN W.P. FRANZ,
BY
ATTORNEY

United States Patent Office 2,987,168
Patented June 6, 1961

2,987,168
CONVEYOR MECHANISM
Ethan W. P. Franz, Cleveland Heights, Ohio, assignor, by mesne assignments, to Ruth R. Young and G. H. Meyfarth, Jr.
Filed Oct. 10, 1957, Ser. No. 689,352
7 Claims. (Cl. 198—195)

This invention relates to endless belt conveyor mechanisms and more particularly to an improved link conveyor belt formed of a plurality of longitudinally serially arranged links especially constructed and hingedly secured together to provide a substantially continuous flat or curvilinear load supporting surface.

Endless conveyors of various types have been built with hingedly secured links for providing substantially continuous even load supporting surfaces and are widely used for transferring ore, coal, grain, packages, and other articles, during processing or transference of such materials from one locality to another. In order to minimize damage to the material being conveyed, as well as to the belt, various configurations of the links of such belts have been provided. It has been found, however, that in conveying certain types of materials it is desirable that the continuous belt surface should be substantially flat or substantially even continuously curvilinear, with a minimum of depressions or spaces between the belt links and in the configuration of each belt link. Such a structure minimizes the entrance of foreign material, such as parts of the material which is being conveyed, into the interior of the belt. It also minimizes the possibility of injury to personnel working around such a belt.

Special conveyor constructions have been used in the past which were intended to eliminate or minimize gaps and open spaces between the links forming the endless belt of a conveyor. These have generally required that the links be of rather special and complicated construction, resulting in a relatively expensive initial conveyor cost and requiring relatively expensive maintenance.

It is an object of this invention to provide an improved link type endless belt conveyor of improved and simplified construction, which will provide a substantially continuous flat or even curvilinear load supporting surface.

Another object of this invention is to provide an improved and simplified conveyor mechanism having an endless link belt with a substantially continuous even flat load-supporting surface and a simple endless chain and sprocket drive on each side of the belt.

A further object of this invention is to provide an improved and simplified conveyor comprising an endless link belt with a substantially continuous even load-supporting surface driven by a pair of simple endless chains and sprockets on each side of the belt and having enclosing aprons or plates on the ends of the links for minimizing the entrance of foreign material between the links and for assuring against injury to operating personnel.

Another object of this invention is to provide an improved conveyor comprising an endless link belt having a substantially continuous even load-supporting surface with an endless chain drive and covers enclosing the belt driving mechanism for assuring against accidental injury to personnel by contact therewith.

An additional object of this invention is to provide a simplified and improved link conveyor which is substantially totally closed both around the belt surface and at the sides of the belt and chain throughout its length and around its return ends for assuring against injury to operating personnel.

Still another object of this invention is to provide a belt conveyor in which the traveling belt supporting surface is above the conveyor framing providing for the transporting of objects wider than the belt without interference with the framing.

A still further object of this invention is to provide a simplified and improved link structure for an endless conveyor belt.

Further objects and advantages of this invention will become apparent from the following description referring to the accompanying drawings and the features of novelty which characterize this invention will be pointed out with particularity in the claims appended to and forming a part of this specification.

Referring to the drawings, an embodiment of an improved conveyor mechanism made in accordance with this invention is illustrated in FIGS. 1-9 in which a substantially even continuous flat and curvilinear load-supporting surface is provided by an improved and simplified endless belt comprising a plurality of longitudinally, serially arranged links, which are hingedly connected together and adapted to be supported and driven by a suitable supporting and driving mechanism. In this construction, all elements are formed and arranged to minimize openings in the structure and to provide substantially even, closed and continuous surfaces. The endless belt is formed of a plurality of links, each of which comprises a load-supporting surface element having transversely alternate wide and narrow sections of substantially equal transverse lengths and arranged to embody the basic even continuous surface feature. The narrow sections are formed with substantially flat load-supporting surfaces 1, integral with the relatively wide sections, which are formed with substantially flat load-supporting central surface portions 2, extending continuously evenly between the narrow sections 1, with tongues 3 extending longitudinally on each side of the central portions 2. The ends of the tongues 3 are formed with inwardly curved outer edge portions 4, which are adapted to form substantially continuous even curvilinear surfaces with adjacent narrow portions of other links of the belt, as will be explained in greater detail later. Preferably, all links in the belt are identical in structure, so as to minimize initial construction costs and to minimize spare links which may be kept in stock for repair purposes.

Figure 1:
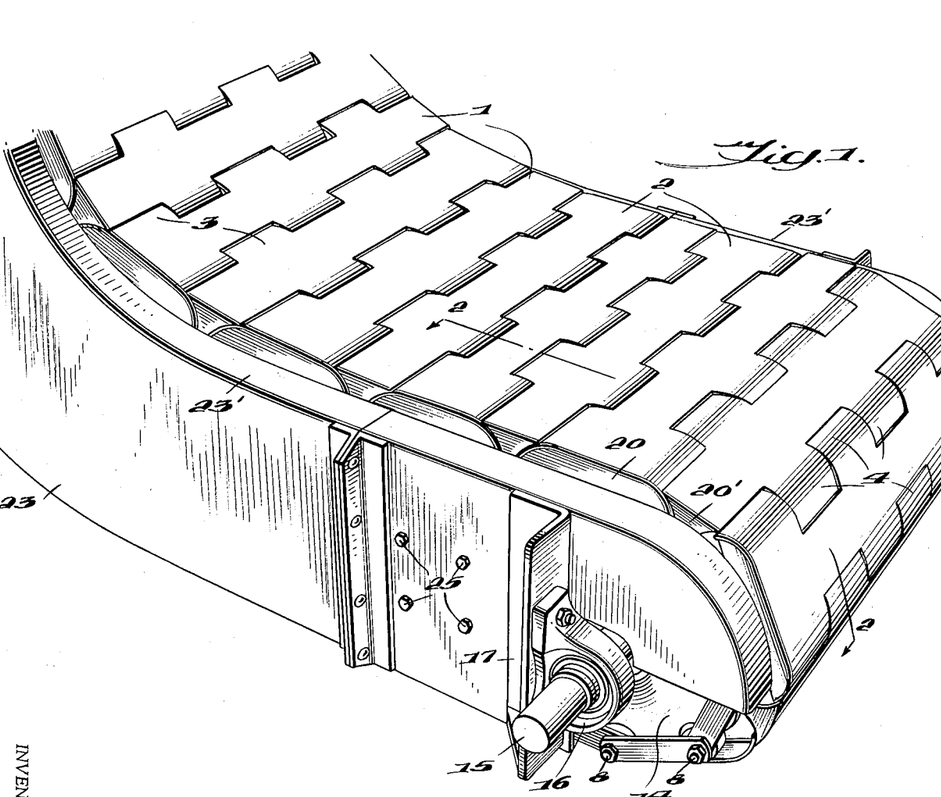
FIG. 1 is a perspective view of the end portion of an improved conveyor mechanism embodying this invention and illustrating the even continuous nature of the load-supporting surface of the conveyor belt.

As shown more clearly in FIG. 1, alternate links are arranged with wide portions on one side of the belt and the intermediate links are arranged with wide portions on the other side of the belt, with the tongues of adjacent links arranged in interdigitated relationship with wide and narrow sections alternately longitudinally aligned. This provides tongues of adjacent links extending longitudinally into abutting relation to narrow sections of adjacent links, with the curved outer portions 4 of the tongues 3 extending under adjacent edges of the narrow sections 1, thereby forming a substantially continuous even exposed load-supporting belt surface.

Figure 6:
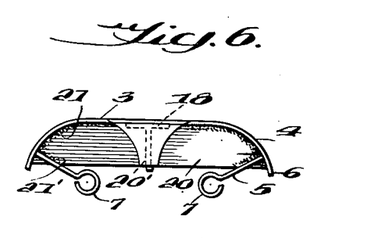
FIG. 6 is an end elevational view of the right-hand end of the link shown in FIG. 4.
Figure 7:
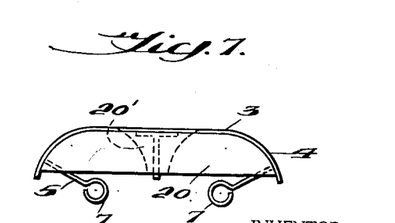
FIG. 7 is an end elevational view of the left-hand end of the belt link shown in FIG. 4.
Figures 8, 9:
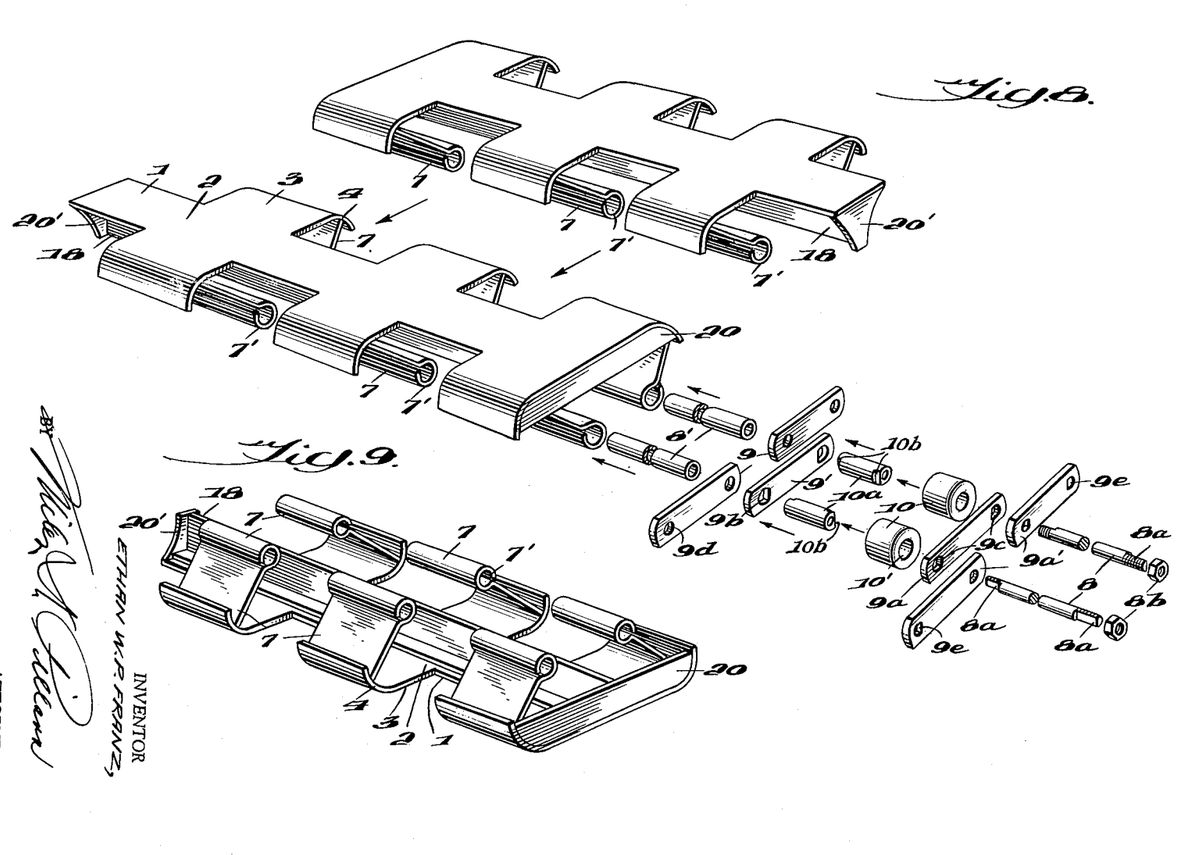
FIG. 8 is an exploded perspective view of two links and one of the driving chains and supporting rollers for use in a conveyor mechanism of the type shown in FIGS. 1-3.
FIG. 9 is a perspective view of the underside of one of the conveyor belt links shown in FIG. 8.
Figure 10:
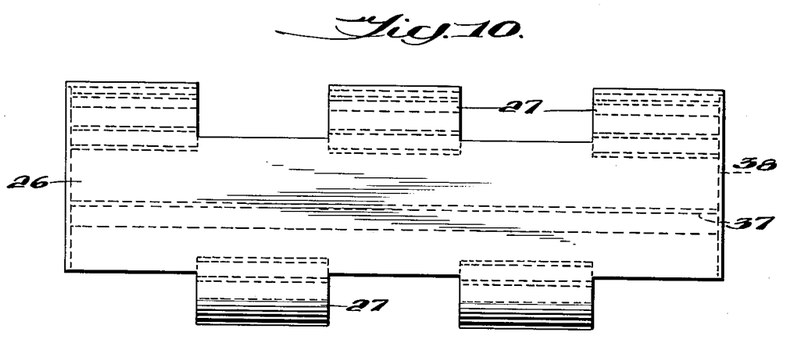
FIG. 10 is a top plan view of another embodiment of this invention in which the tongues on the belt links are staggered on opposite sides of each link.
Figure 11:
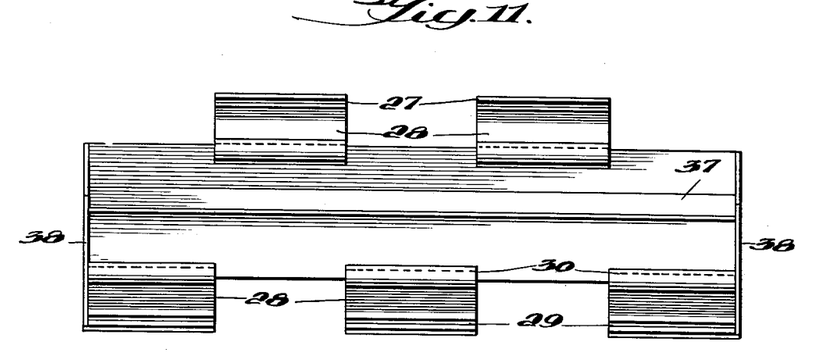
FIG. 11 is a bottom plan view showing the underside of the link illustrated in FIG. 10.

The links forming the endless belt are adapted to be hingedly secured together by a plurality of hinge plates 5 extending inwardly angularly from the underside of each curved outer portion 4 of each tongue. These hinge plates may be secured to the tongues in any suitable manner and preferably are secured to the underside of the curved outer portion 4 of the tongues adjacent the outer edge thereof, as shown in FIGS. 6 and 7, by a series of welds 6. The inner transverse edge of each hinge plate is formed with a hinge loop 7, which extends transversely of the plate and is adapted to be aligned with adjacent hinge loops on adjacent links, so as to provide a substantially continuous even transverse channel for the reception of a suitable hinge connecting member. In order to provide an efficient and long wearing hinged connection between adjacent belt links, the interdigitated hinge loops 7 are connected together by a hinge pin 8 fitted into a bushing 8', which extends transversely of the belt through aligned hinge loops 7 into which it is closely fitted. This provides closely interdigitated hinge loops 7, as is more clearly shown in FIG. 3, having axial bearing surfaces on each other through adjacent ends 7' and forming sturdy connections between adjacent links. This arrangement also minimizes relative axial movement between adjacent hinge loops whereby axial alignment of the load-supporting surfaces of adjacent links is maintained and gaps therebetween through which material might pass into the interior of the belt or lodge between adjacent links causing damage to the link belt, or requiring stopping the operation of the belt in order to remove such particles, is minimized.

The belt is adapted to be supported and driven in any suitable manner, and this preferably is provided by an endless chain arranged on each side of the conveyor belt and secured to the belt through the hinge pins 8. The endless chain may comprise a plurality of pairs of transversely spaced sets of inner and outer bars 9 and 9' and 9a and 9a', respectively, longitudinally arranged adjacent to each outer side of each belt link, with a supporting roller 10 arranged between the inner and outer sets of chain bars.

In order further to minimize wear of the moving parts, a short tubular bushing 10a is arranged in rotatable supporting relation in a central aperture 10' in each roller 10. Apertures are formed in the overlapping ends of the chain bars in alignment with the hinge loops 7, and the aperture forming surfaces in the bars 9' and 9a nearer to each of the rollers 10 are formed with key locking portions 9b and 9c. The ends of the short bushings 10a are formed with notches 10b adapted to fit non-rotatably into the key locking apertures 9b and 9c of the chain bars, so as substantially to prevent relative movement therebetween and to minimize wear of these parts.

Proper spacing of the chains on opposite sides of the belt with a minimum of friction is assured by arranging the long tubular bushing 8' with the ends thereof in substantially abutting relation to the inner sides of the adjacent innermost chain bars 9. Preferably, the hinge pins 8 are non-rotatably secured in position extending through the long bushings 8', the apertures 9d of the innermost chain bars 9, and the short bushings 10a, by forming flat notches 8a on the ends thereof and arranging these ends in apertures in the outermost chain bars 9a', with the notches 8a in engagement with key locking surfaces 9e of the apertures. The belt links and chain are held in assembled relation by suitable retaining elements, such as nuts 8b threaded on the ends of the pins 8, and provide a flexible assembly with a minimum of relatively movable wearing parts.

Figures 2, 3:
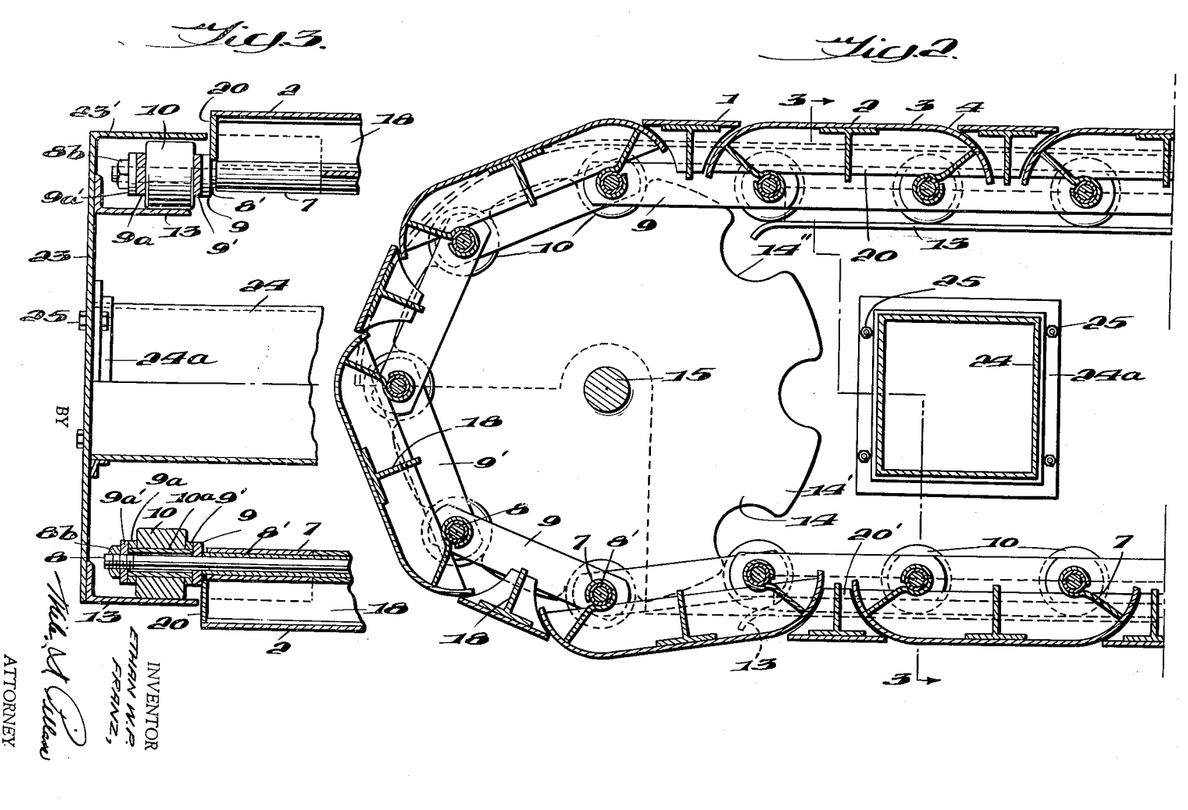
FIG. 2 is a sectional side elevational view of the end of the conveyor mechanism shown in FIG. 1, with the section taken along line 2—2, through substantially the longitudinal center of a wide portion of alternate links of the conveyor.
FIG. 3 is a fragmentary sectional view, taken along line 3—3 of FIG. 2, illustrating the manner in which the link belt is supported on the mounting rails of the conveyor and showing the lower side of the belt and supporting chain in section.
Figure 4:
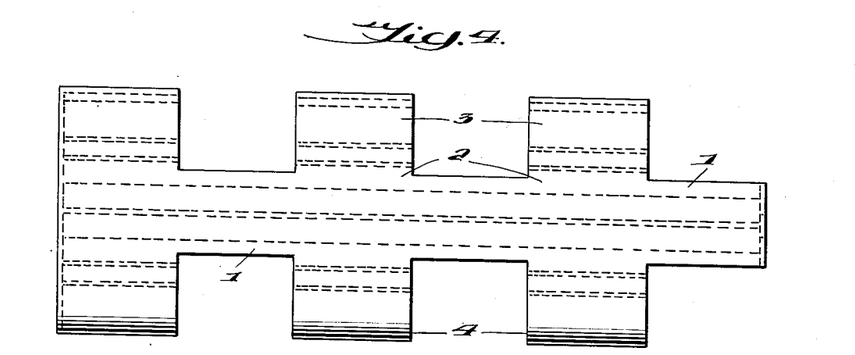
FIG. 4 is an enlarged top plan view of a link of the endless belt shown in FIGS. 1-3.

Suitable supporting tracks 13 are mounted on a belt supporting frame and are adapted to be engaged by the supporting rollers 10, as is more clearly shown in FIGS. 2 and 3, for carrying the endless belt and guiding it in the manner desired. The endless belt is adapted to be driven by any suitable source of power through sprocket wheels 14 having teeth 14' thereon which extend between the inner and outer sets of chain bars. The sprocket wheels are formed with roller seats 14" between the teeth 14' which engage and support the rollers 10 at the return loop ends of the endless belt, thus driving the endless belt through the rollers 10 while supporting and guiding the belt in its travel from one direction around the end loop of the belt to its return travel position. This is more clearly shown in FIGS. 1 and 2. In order to equalize the driving force on the endless belt and to maintain substantially parallel alignment of the links, a sprocket wheel 14 preferably is arranged on each side of the return loop of the endless belt and these sprocket wheels 14 are mounted upon a suitable drive shaft 15 rotatably supported by bearings 16 which may be conveniently mounted on a belt frame bracket 17.

In order to provide a link belt which is adapted to support relatively heavy loads, and in order to minimize maintenance and repairs, each belt link preferably is provided with a T-section reinforcing bar 18 which extends transversely along the inner side of each link. These reinforcing bars may have any suitable configuration and a T-section bar 18 is very appropriate for this use. Such a bar may be arranged on the underside of a link with an edge of the stem of the T-section presented toward the underside of the link and the width thereof substantially perpendicular to the central portion of the link. The bar 18 may be secured to the link in any suitable manner, as by welds 19 of the head of the T-section bar to the undersurface of the link. The arrangement of these T-section bars 18 transversely across the links substantially along the transverse center line of each link, with the flange or stem of the T-section bar substantially at right angles to the load-supporting surface of each link, provides a maximum rigidity and strength to each link.

Figure 5:
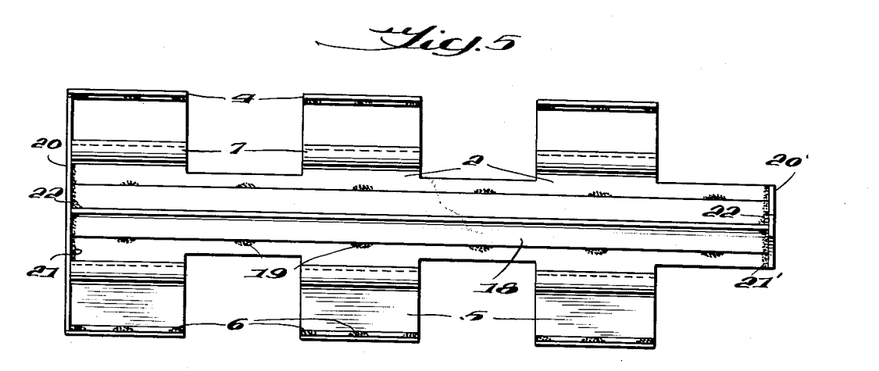
FIG. 5 is a plan view of the underside of the belt link shown in FIG. 4.

In order further to minimize maintenance and repairs and to provide a maximum of safety to operating personnel, the sides of the belt links preferably are substantially enclosed by relatively long and short longitudinally extending end plates 20 and 20' welded along the inner upper edges 21 and 21' thereof, respectively, to the undersides of the load-supporting surfaces of the belt links, as shown in FIGS. 3, 5 and 6. The end plates 20 and 20' also preferably are welded to the outer edges 22 and 22' of the reinforcing T-section bar 18. The relatively longer end plates 20 also may be welded at 21' to the outer edges of adjacent hinge plates 5 so as to reinforce the belt link support and further assure against the passage of foreign materials into the interior of the belt.

Further shielding and protection of the conveyor belt against the entrance of foreign materials between the sides of the belt and protection of operating personnel from possible injury is provided by arranging suitable side frames or guards 23 over the outer portion of the belt and forming these guards 23 with transversely extending flanges 23' which extend over the outer surfaces of the chains and rollers on each side of the belt, so as substantially to encase the supporting tracks 13 and the associated belt supporting and operating mechanism. The flanges 23' may extend at a slightly lower level than the upper load-supporting surface of the belt, thus allowing for an overhang of articles larger than the belt free from interference with the framing. As shown in FIG. 1, this presents a substantially even, continuously smooth conveyor surface comprising the substantially continuous even load-supporting belt surface extending between substantially smooth encasing side walls formed by the end plates 20 and 21 and the side frames or guards 23.

In order further to strengthen the supporting frame, suitable cross braces between the side frames or guards 23 may be provided. While these may take any desired form, such a brace may comprise a square sectioned member 24 extending between the inner sides of the side frames 23 and suitably secured thereto by end flanges 24a bolted to the side frames by bolts 25. This improved belt structure thus provides an arrangement in which relatively heavy loads may be effectively transported by the belt with a minimum possibility of interference between the load and the belt and with a maximum of safety to operating personnel.

Adjustments in the length of the conveyor belt and cleaning and repairs of the belt can readily be made by simply removing the nuts 8b from the hings pins 8 on the lower side of the return loop of the belt, as shown in FIG. 1, and withdrawing the desired hinge pin 8. In most constructions it will not be found necessary to enclose this lower part of the return loop of the conveyor belt, thereby providing a convenient point for occasional inspection of the belt to determine whether or not cleaning and repairs are required. It also provides for more quickly assembling and disassembling the belt when cleaning, adjusting, or repairing the same becomes desirable.

In FIGS. 10–16 another embodiment of this improved conveyor belt and link structure, and a method of making the same, are illustrated. As in the previously described conveyor construction, a plurality of longitudinally serially arranged belt links are pivotally connected together to form an endless belt having a substantially even continuous load-supporting surface and presenting an outer surface around the return loops of the belt which also are substantially closed at all times. This provides for advantageously diverting or plowing off large and small articles which may be carried by the belt, assuring against entrance of parts of the articles between adjacent links, and also assuring the safety of operating personnel by presenting a substantially closed conveyor belt surface.

In this construction, each belt link is formed with a continuous central portion 26 having an outer flat load-supporting surface of substantially uniform width. A plurality of transversely spaced curved tongues 27 are arranged on each side of the central portion 26 and extend in a direction curved away from the load-supporting surface of the central portion 26, as is more clearly shown in FIGS. 12, 13, and 14. These tongues 27 are spaced apart substantially the transverse width of a tongue and are arranged in staggered relation on opposite sides of the central portion of the link. The links of the conveyor belt are adapted to be pivotally secured together to provide a flexible belt which can be readily operated around suitable return bends at each end of the belt and which can also provide for concave or reverse bends in the belt which may be found desirable where the belt is utilized to carry loads along a horizontal stretch of belt and then to carry the loads to a higher level over an inclined portion of the belt. This flexible belt structure is obtained by providing each of the belt links with an inwardly angularly extending hinge plate 28 which is formed with a curved flange 29 on one end thereof secured, as by spot, line, or flash welding, to the concave underside of each of the curved tongues 27. Each hinge plate 28 is formed with a hinge loop 30 on the inner transverse edge thereof and the tongues of adjacent belt links are interdigitated with adjacent tongues of adjacent links. This places adjacent edges of hinge loops of adjacent links in bearing contact and assures against relative longitudinal movement or looseness between links of the belt. In this construction the hinge loops of adjacent links preferably are pivotally secured together in the same manner as the hinge loops of the previously described embodiment, illustrated in detail in FIG. 8. If desired, a more simple structure may also be utilized in which a simple hinge pin 31 extends longitudinally through aligned hinge hoops 30 of adjacent links.

Figures 14, 15, 16:
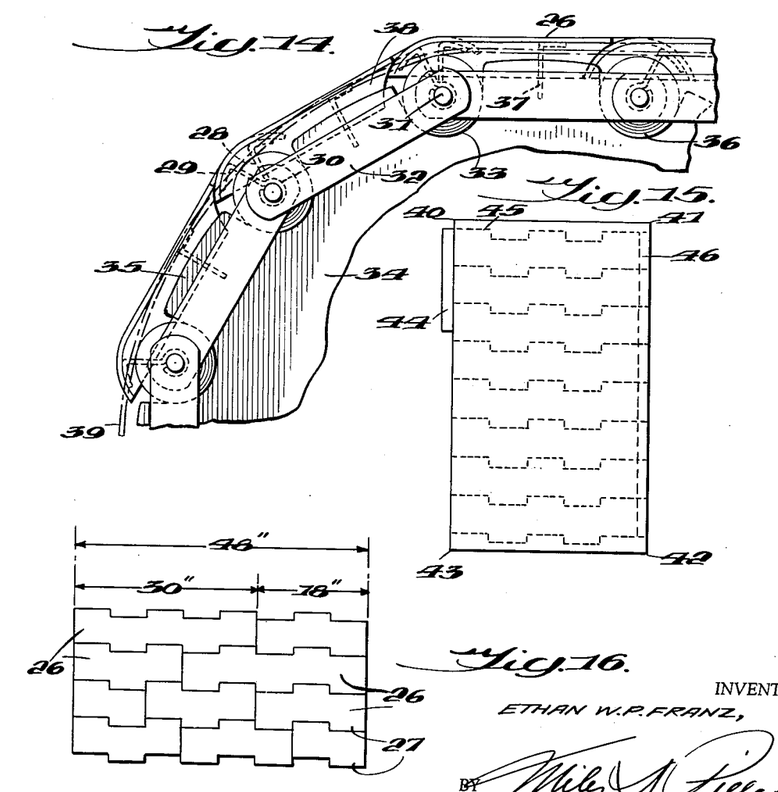
FIG. 14 is a fragmentary view of the end of a conveyor provided with a belt, formed of links of the type shown in FIGS. 10-13, with the retaining nuts on the ends of the hinge pins removed and the enclosing casing removed in order better to illustrate the structure and arrangement of the belt links and the supporting and driving chain.
FIG. 15 is a schematic plan view illustrating a method of forming belt link blanks of the type shown in FIGS. 10-14.
FIG. 16 is a schematic plan view of a belt utilizing links of the type shown in FIGS. 10-13 in which the width of the belt is greater than the transverse width of a link.

A conveyor belt of this construction preferably is supported and driven by a suitable pair of parallel longitudinally extending endless chains arranged on opposite sides of the conveyor belt. These chains may comprise the same structural elements as those illustrated with reference to the previously described embodiment of this invention, shown in FIGS. 3 and 8, and may comprise pairs of inner and outer chain bars 32 arranged on opposite edges of supporting rollers 33, all of which are pivotally mounted on the ends of the hinge pins 31. Any suitable retaining element, such as a nut, may be used to fasten the chain bars and rollers in position on the hinge pins 31. Such nuts or other retaining elements are not illustrated in FIG. 14 in order to simplify the illustration of the belt links and supporting chain. A chain of this type is adapted to be driven by any suitable means, such as a pair of sprocket wheels 34 arranged on each side of the conveyor belt at each return loop thereof and having sprocket teeth 35 which extend between the chain bars 32 and are formed with roller seats 36 for engaging the rollers 33, as shown in FIG. 14.

In order to increase the load-carrying capacity of the belt and to assure transverse rigidity of the load-carrying surfaces of the links, each link preferably is provided with a reinforcing member which extends transversely the full width of each link and may take the form of an angle bar 37 suitably secured, as by welding, to the underside of the central portion 26 of the link.

Figure 12:
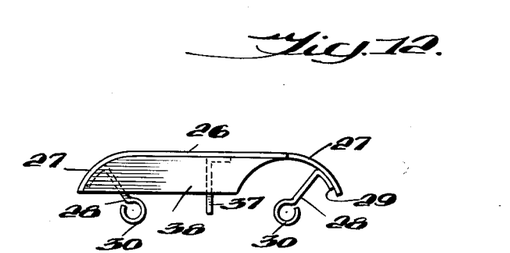
FIG. 12 is an end elevational view of the link shown in FIGS. 10 and 11.
Figure 13:
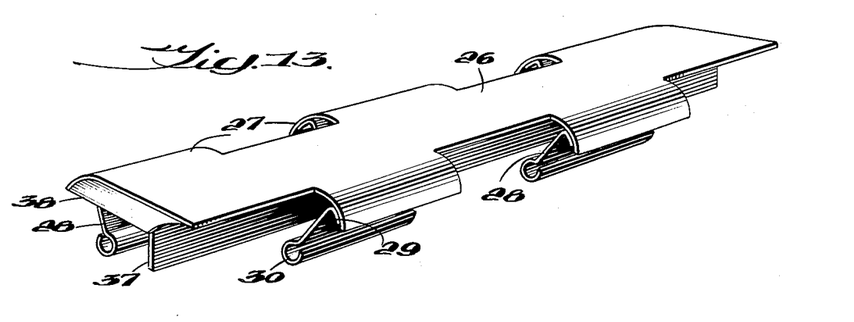
FIG. 13 is a perspective view of the link shown in FIGS. 10, 11, and 12.

In order further to assure the safety of the operating personnel, each end of each belt link is provided with an end plate 38 which encloses the side of the link having a tongue 27 thereon, as is more clearly shown in FIGS. 12 and 13. The other side of each end plate 38 preferably is curved on an arc having substantially the same radius as the outer surface of the link tongues, so that the adjacent tongue of the adjacent link in the conveyor belt and the adjacent end plate 38 on this adjacent belt link form a substantially closed end surface to the belt. This assures against the entrance of foreign substances within the belt and also encloses this portion of the belt and assures a maximum safety to the operating personnel.

In order further to provide a totally enclosed belt, the sides of the conveyor structure and the supporting and driving chains preferably are enclosed in a housing similar to that shown in FIG. 1. The ends of such a housing may conveniently be curved as indicated by the dash lines 39 so as to form a substantially totally closed conveyor structure, as the housing, indicated at 39, and the end plates 38 effectively close the sides of the conveyor around the return loops of the belt and also along the load-carrying stretches thereof.

This staggered tongue arrangement also lends itself to manufacturing economies which can be more easily understood by reference to FIGS. 15 and 16. In FIG. 15 a strip of metal 40—41—42—43 is shown from which belt link blanks are adapted to be cut. In making the link blanks the metal sheet is aligned with one edge along a guide bar 44 and is then cut as indicated at the dotted line 45. The sheet is next moved up the length of a blank and the cutting or punching step is repeated. The blank then is cut to the proper length by removal of excess material along the edge indicated by the dotted line 46. This completes the cutting of a link blank from the metal sheet. The staggered tongue arrangement makes it possible to utilize a repetitive cutting pattern of this type, irrespective of the number of tongues across each link as all such links are identical and adjacent ends of adjacent links are always alike for any given belt. It is seen, therefore, that very little waste material results in the manufacture of belt links having staggered tongues of this type, the only waste material being a small section at the start and end of each sheet between the end edges and the first and last cuts, and the material trimmed off along the side edge to give the desired width to the blank. This results in a simple cutting operation and a maximum utilization of the sheet material during the blanking steps in the manufacture of the belt.

Furthermore, links of any desired transverse dimension or number of tongues can be made by simply cutting a standard link blank to the desired number of tongues or by the addition of the desired number of tongues to a standard link. For example, a blank such as that shown in FIG. 15 having five tongues can readily be cut to form a belt having 2, 3, 4, or 5 tongues and also can be used in combination with segments of a standard link having 2, 3, or 4 tongues, or with additional whole links. Preferably, when more than one belt link is used to form the desired width of a conveyor belt, the joints between adjacent link segments are staggered, as shown in FIG. 16. The belt illustrated in this figure is formed of 8 tongues transversely of the belt and may conveniently comprise 4 different combinations or arrangements of link segments to provide the desired staggering of the joints. The illustration suggests 6" tongues which can be combined conveniently to form various standard belt widths but any suitable dimension may be utilized. Also the number of tongues which are cut to form a standard belt link blank need not be limited to a five-tongue structure, as obviously certain other dimensions and combinations of tongues may be found more suitable for certain installations.

The embodiments of this invention which have been illustrated and described are particularly useful in conveyor installations where the belt is adapted to carry articles along a horizontal stretch and also up an inclined stretch, so that the belt is required to change direction along a concave bend. The telescopic arrangement of the tongues of the belt link under the central portions of adjacent belt links facilitates and provides for the continuous travel of belts made in accordance with this invention around both concave and convex turns and maintains the outer surface of the belt substantially continuous around these turns, as well as along plane stretches of the belt.

This invention is directed to conveyor structures somewhat similar to the type of conveyor disclosed and claimed in co-pending application Serial No. 689,306, filed October 10, 1957.

While particular embodiments of this invention have been illustrated and described, modifications thereof will occur to those skilled in the art. It is to be understood, therefore, that this invention is not to be limited to the particular arrangements disclosed, and it is intended in the appended claims to cover all modifications which do not depart from the spirit and scope of this invention.

I claim:
1. An endless load-supporting belt comprising a plurality of longitudinally serially arranged links, each of said links including a load-supporting surface element having transversely alternate wide and narrow sections of substantially equal transverse lengths, said narrow sections having substantially flat load-supporting surfaces and said wide sections having substantially flat load-supporting central surface portions with tongues extending longitudinally on each side of said central portions and having inwardly curved outer edge portions defining substantially the quadrant of a circle in cross section, tongues of adjacent links being interdigitated with said curved outer portions of the tongues extending under adjacent edges of narrow sections of adjacent links forming a substantially even continuous load-supporting belt surface, and hinges fastened to the undersides of the links for pivotally securing together longitudinally adjacent belt links.

2. In a conveyor, a pair of parallel longitudinally extending endless chains, a load-supporting endless belt comprising a plurality of longitudinally serially arranged links between said pair of chains, each of said links including a load-supporting surface element having transversely alternate wide and narrow sections of substantially equal transverse lengths, said narrow sections having substantially flat load-supporting surfaces and said wide sections having substantially flat central load-supporting surface portions with tongues extending longitudinally on each side of said central portions and having inwardly curved outer edge portions, tongues of adjacent links being interdigitated with said curved outer portions of said tongues extending under adjacent edges of narrow sections of adjacent links forming a substantially even continuous load-supporting belt surface, means including angularly extending hinge plates secured to the underside of each of said links with hinge loops along the edges thereof in axial alignment with hinge loops on adjacent links for forming sets of transversely aligned interdigitated hinge loops, and means including hinge pins extending through said sets of interdigitated hinge loops and said pair of chains for hingedly securing together adjacent belt links and said chains.

3. A conveyor belt comprising a plurality of serially arranged links, each of said links including a sheet metal load-supporting surface element having transversely alternate wide and narrow sections of substantially equal transverse lengths, said narrow sections having substantially flat planar surfaces and said wide sections having substantially flat planar central surface portions with tongues extending longitudinally on each side of said central portions and having inwardly curved outer edge portions, means including a T-section bar extending transversely of each link for transversely reinforcing said link, said links being interdigitated longitudinally with wide and narrow sections alternately aligned providing tongues of adjacent links extending longitudinally into abutting relation to narrow sections of adjacent links with said curved outer portions of said tongues extending under adjacent edges of said narrow sections forming a substantially even continuous load-supporting belt surface, means including an inwardly angularly extending hinge plate secured to the underside of each of said tongue curved outer portions with hinge loops on the inner edges thereof in axial alignment with hinge loops on adjacent link tongues for forming sets of transversely aligned hinge loops, and means including hinge pins extending through said sets of aligned hinge loops for hingedly securing together adjacent belt links.

4. A conveyor mechanism including a belt comprising a plurality of serially arranged links, each of said links including a load-supporting surface element having transversely alternate wide and narrow sections of substantially equal transverse lengths, said narrow sections having substantially flat surfaces and said wide sections having substantially flat central surface portions with tongues extending longitudinally on each side of said central portions and having inwardly curved outer edge portions, said links being interdigitated longitudinally with wide and narrow sections alternately aligned providing tongues of adjacent links extending longitudinall into abutting relation to narrow sections of adjacent links with said curved outer portions extending under adjacent edges of said narrow sections forming a substantially even continuous load-supporting belt surface, means including an inwardly angularly extending hinge plate secured to the underside of each of said tongue curved outer portions with hinge loops on the inner edges thereof in interdigitated axial alignment with hinge loops on adjacent link tongues for forming sets of transversely aligned hinge loops, an endless chain on each side of said belt comprising a plurality of pairs of transversely spaced inner and outer bars longitudinally arranged adjacent to each outer side of each of said belt links and with ends of longitudinally adjacent pairs of bars in overlapping relation, apertures through said overlapping bar ends, a roller positioned between each pair of inner and outer overlapped bar ends, an axial passage through each of said rollers aligned with the apertures in the adjacent overlapped bar ends and with a set of adjacent interdigitated hinge loops of adjacent belt links, and means including a hinge pin extending through said interdigitated hinge loops and adjacent overlapping bar ends and rollers on each end of each belt link for hingedly securing together longitudinally adjacent belt links and chain bars.

5. A link for an endless load-supporting belt including a load-supporting surface element having a substantially flat load-supporting central portion extending continuously transversely of said link and having a plurality of tongues extending longitudinally on each side of said central portion and having curved outer edge portions, means including a T-section member extending transversely across said link and secured to said central portion for reinforcing said link, and an inwardly angularly extending hinge plate secured to the concave underside of each of said curved portions of said tongues with a hinge loop on the inner transverse edge thereof.

6. An endless load-supporting belt comprising a plurality of longitudinally serially arranged links, each of said links having a flat load-supporting central portion of substantially uniform width with a plurality of transversely spaced curved tongues extending on each side of said central portion, said tongues being spaced apart substantially the transverse width of a tongue, tongues of adjacent links being interdigitated and extending under adjacent flat portions of adjacent links forming a substantially even continuous belt surface for both flat and curved stratches of the belt, means including a substantially T-section bar extending transversely across each link for reinforcing said links, means including an inwardly angularly extending hinge plate secured to the underside of each of said tongues with hinge loops on the inner edges thereof in axial alignment with hinge loops on adjacent link tongues for forming sets of transversely aligned hinge loops, and means including hinge pins extending through said sets of aligned hinge loops for hingedly securing together adjacent belt links.

7. A link for an endless load-supporting belt including a load-supporting surface element having a central portion with a flat load-supporting surface of substantially uniform width, a plurality of transversely spaced curved tongues on each side of said central portion extending away from the load-supporting surface thereof, means including a reinforcing member extending transversely across said link and having a flange secured to the underside of said central portion with a web extending substantially perpendicular thereto, and angularly extending hinge plates secured to the underside of said link with hinge loops on the lower transverse edges thereof.

References Cited in the file of this patent

UNITED STATES PATENTS

| | | |
|---|---|---|
| 1,803,367 | Stevenson | May 5, 1931 |
| 1,824,756 | Welser | Sept. 22, 1931 |
| 2,165,395 | MacChesney et al. | July 11, 1939 |
| 2,564,533 | Imse | Aug. 14, 1951 |
| 2,725,975 | Franz | Dec. 6, 1955 |